(12) United States Patent
Morisset

(10) Patent No.: US 8,100,419 B2  
(45) Date of Patent: Jan. 24, 2012

(54) ADJUSTABLE DOOR AND PANEL CARRIER

(76) Inventor: Jacques R Morisset, Hesperia, CA (US)

(*) Notice: Subject to any disclaimer, the term of this patent is extended or adjusted under 35 U.S.C. 154(b) by 301 days.

(21) Appl. No.: 12/607,033

(22) Filed: Oct. 27, 2009

(65) Prior Publication Data

US 2011/0095498 A1  Apr. 28, 2011

(51) Int. Cl.
*B62B 1/00* (2006.01)

(52) U.S. Cl. .................................... 280/79.7

(58) Field of Classification Search ............... 280/79.7, 280/79.11
See application file for complete search history.

(56) References Cited

U.S. PATENT DOCUMENTS

| | | | | |
|---|---|---|---|---|
| 3,580,601 A * | 5/1971 | Miles | ................. | 280/47.131 |
| 3,717,357 A * | 2/1973 | Schaefer | .................. | 280/35 |
| 4,138,099 A * | 2/1979 | Englehart | .................. | 269/17 |
| 4,270,741 A * | 6/1981 | Hurst | .................. | 269/17 |
| 4,695,067 A * | 9/1987 | Willey | .................. | 280/47.22 |
| 5,112,070 A * | 5/1992 | Hahn | .................. | 280/79.4 |
| 5,284,410 A * | 2/1994 | Sare et al. | .................. | 414/11 |
| 5,318,316 A * | 6/1994 | Shurtleff | .................. | 280/79.7 |
| 5,879,014 A * | 3/1999 | Price | .................. | 280/47.18 |
| 5,927,731 A * | 7/1999 | Clarke | .................. | 280/79.7 |
| 6,663,123 B1 * | 12/2003 | Kovacs | .................. | 280/79.7 |
| 8,002,510 B2 * | 8/2011 | Williams | .................. | 414/10 |

\* cited by examiner

*Primary Examiner* — J. Allen Shriver, II  
*Assistant Examiner* — James M Dolak

(57) ABSTRACT

An adjustable door and panel carrier has an adjustable gripping cradle mounted on two large pneumatic wheels. A single control lever positioned on an outside face of one of the outside walls moves both gripping panels simultaneously and smoothly to secure large planar objects on a cushioned, non-slip platform.

7 Claims, 4 Drawing Sheets

ADJUSTABLE DOOR AND PANEL CARRIER

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

Field of the Invention

The present invention relates to apparatus for transporting large panels and in particular to an adjustable panel dolly apparatus having an adjustable gripping cradle mounted on two large pneumatic wheels with a single control lever positioned on an outside face of one of the outside walls for moving both gripping panels simultaneously and smoothly to secure large planar objects on a padded bottom platform. Description of Related Art including information disclosed under 37 CFR 1.97 and 1.98

Transporting large planar objects, such as doors and structural panels is a difficult and tiring task and is subject to damaging the objects. Prior art devices to assist in carrying doors and panels are often complex and may be difficult to operate and control by a single worker.

U.S. Pat. No. 4,270,741, issued Jun. 2, 1981 to Hurst, concerns a vise for thin objects such as doors which has improved features that allows the doors to be transported on the vise and also accommodates various thicknesses of doors. The vise has a pair of jaws hinged together by a spring loaded hinge. The spring urges the jaws apart. The weight of the door overcomes the spring, drawing the jaws into contact with the door for support. Each jaw is mounted on a wheel for transporting. Each jaw also has an adjustable plate mounted on its inner side for varying the effective opening of the jaws.

U.S. Pat. No. 3,845,969, issued Nov. 5, 1974 to Nadeau, discloses a dolly provided by attaching upright angle brackets to the leaves of a butt type hinge. Two wheels are mounted to the lower flanges of the angle brackets and the weight of the door causes the upright flanges of the angle brackets to be urged toward one another by pivoting about the hinge pivot axis. A clamp on the underside of the hinge also holds the door to be transported on the dolly.

U.S. Pat. No. 3,717,357, issued Feb. 20, 1973 to Schaefer, shows a single axle two-wheel dolly for panels which adjusts in width by bolts in sliding slots at the bottom of the two L-shaped sides.

U.S. Pat. No. 1,103,486, issued Jul. 14, 1914 to Cobb, describes a two wheel automatic gripping dolly for panels with a spring connecting the two sides at the bottom.

U.S. Pat. No. 5,318,316, issued Jun. 7, 1994 to Shurtleff, puts forth carts for transporting doors, sheets of plywood and dry wall, narrow crates, mirrors, and other large, awkward-to-handle and perhaps fragile articles of similar configurations in a horizontal orientation which allows the object to be freely manipulated through a doorway or other opening. The article is automatically and securely clamped between cooperating fixed and displaceable jaws in the process of loading it into the cart; and the article is thereafter automatically released from the jaws when it is lifted upwardly to remove it from the cart. An easily removable handle makes the cart easy to manipulate and, at the same time, permits it to easily be broken down for storage, shipment, etc. Front and rear, leg-like stops limit fore-and-aft tilting of the door cart and thereby facilitate the loading of materials into the cart.

U.S. Pat. No. 4,695,067, issued Sep. 22, 1987 to Willey, illustrates a wheeled carrier for transporting elongate articles having a wheeled axle, a dynamic clamp for the article including spring biasing to return the clamp to a relaxed position when the article is removed therefrom, and a suspension extending between the clamp and the axle to absorb shocks transmitted from the wheels so that the clamping force on the article is substantially constant. A "T" handle will move the carrier when empty by picking up the entire carrier, due to its light weight.

U.S. Pat. No. 5,284,410, issued Feb. 8, 1994 to Sare et al, provides a dolly for carrying sheet material which consists of an elongated substantially U-shaped frame having a pair of spaced side walls projecting upwardly from a base, so as to receive part of one edge of the sheet material therein. A boss is integrally formed with the base of the frame and depends centrally therefrom. A shaft is mounted in the boss with its ends projecting on opposite sides of the boss. A pair of wheels are provided, with each journalled for rotation on each end of the shaft, so that a person can grip and push the sheet material to transport it along a flat surface.

U.S. Pat. No. 6,663,123 issued Dec. 16, 2003 to Kovacs, claims a panel mover designed for receiving, holding and moving a panel and comprises: first and second elongate arms each having an upper end and a lower end and each having a length of between approximately 2 feet and approximately 4 feet; panel support structure connected between the arms; a wheel mounted to each arm on a wheel shaft extending from an outer side of each arm at the lower end of each arm; and, inwardly facing engaging structure only at the upper end of each arm for engaging the side surface of a panel positioned between the arms, whereby, when, an elongate edge of a panel is placed on the panel support stricture, the weight of the panel will cause each elongate arm to rotate upwardly around one of the wheel shafts and pivot inwardly toward the panel to a panel engaging position where the engaging structure at the upper end of each arm engages the panel. The arms have padding and there is a spring between them at the bottom.

What is needed is an adjustable panel dolly apparatus having an adjustable gripping cradle mounted on two large pneumatic wheels with a single control lever positioned on an outside face of one of the outside walls for moving both gripping panels simultaneously and smoothly to secure large planar objects on a padded bottom platform.

BRIEF SUMMARY OF THE INVENTION

An object of the present invention is to provide an adjustable panel dolly apparatus having an adjustable gripping cradle mounted on two large pneumatic wheels with a single control lever positioned on an outside face of one of the outside walls for moving both gripping panels simultaneously and smoothly to secure large planar objects on a padded bottom platform.

Another object of the present invention is to provide a cushioned non-slip material on the bottom receiving platform.

One more object of the present invention is to provide grip spacing gauge with variable adjustments to use in conjunction with the single control lever and control knob.

An additional object of the present invention is to provide a handle on each side of the dolly apparatus for lifting and carrying the dolly when not carrying a load.

In brief, an adjustable panel dolly has center gripping panels adjustable from ½" to 2½" wide in order to accommodate a variety of elongated panels, doors, or any large planar sheets. This device has a surface that receives the panels on a cushioned, non-slip material to protect the edges and at the same time retain the panels from sliding off the panel dolly. Each of the sides of the panel dolly has a pair of nested cylindrical hollow drums with a series of spaced parallel linear groves around an external drum with a mating protrusion from the inner drum riding in each of the grooves. This process allows different sizes of panels to be gently inserted in order to transport to different locations. Both internal sides fully moved inward allows a panel of ½" to fit between the sides. Moving the inner gripping panels outward widens the gap therebetween and allows wider material to be inserted between the two inner gripping panels. Both adjustable inner gripping panels are adjusted by one exterior handle connected to the one of the sides which turns a hub to move the adjacent drum. A cable looped around an exterior drum on the control side with the cable affixed to a point on the control side exterior drum extends downwardly through tubes and under the cradle and loops over the exterior drum on the opposite side and attaches to a point on that exterior drum so that both drums turn simultaneously by turning the handle connected to the hub of the first drum.

A counteracting spring is mounted between each internal drum and the adjacent exterior side panel to aid in retracting the drum to its original position.

A bottom spring between the base and the cable tubes assists in maintaining uniform tension to insure even sliding of the two inner panels even if the cable stretches over time.

The assembly rides on an axle extending through the base, and mounted on this axle are pneumatic wheels on each side of the panel dolly making it maneuverable over obstacles without hindering the handling of the device. The device has a handle on the top of both outside panels to aid in its transportation when not carrying a load.

An advantage of the present invention is it provides a means for a single person to easily transport large planar objects.

Another advantage of the present invention is it provides a single adjustment to simultaneously adjust both sides of the dolly to accommodate many sizes of planar objects.

One more advantage of the present invention is to provide easy transportation of the device when not in use by providing handles on both sides of the device.

An additional advantage of the present invention is to provide protection and security of the planar objects being transported with a non-slip, cushioned platform for the objects to rest upon.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings.

DETAILED DESCRIPTION OF THE INVENTION

Figure 1:
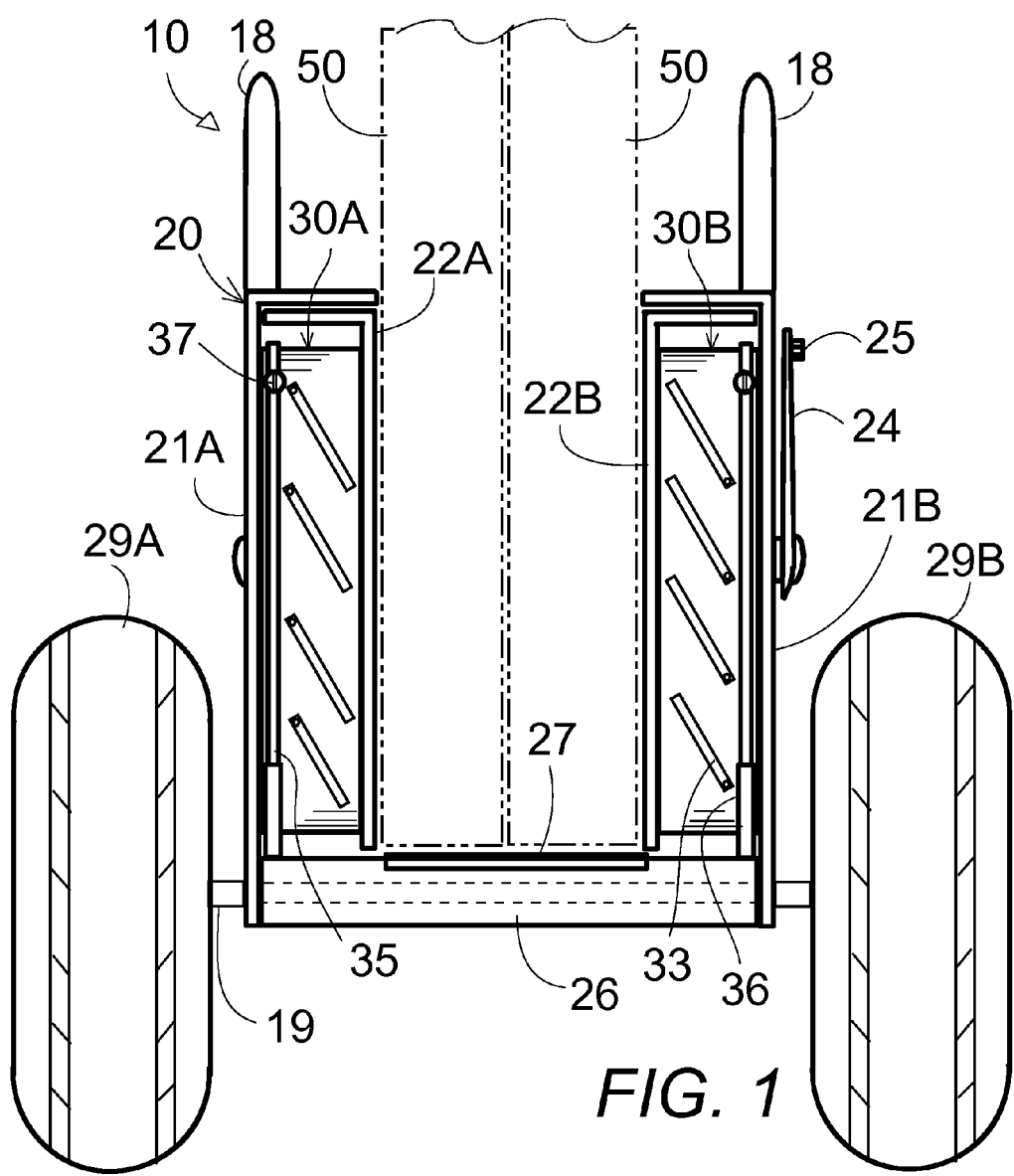
FIG. 1 is a front elevational view of the adjustable panel dolly apparatus of the present invention shown with a couple of panels secured in the cradle and the front facing walls of the side panels removed for viewing the double nested cylinder and cable loop adjustable gripping mechanism.

In FIGS. 1-4, an adjustable panel dolly apparatus 10 comprises an adjustable gripping cradle 20 that is movable by a pair of pneumatic wheels 29A and 29B connected by an axle 19 to the bottom receiving platform 26 of the gripping cradle 20. The adjustable gripping cradle 20 can receive at least one planar object 50 with an edge of the planar object 50 resting on the bottom receiving platform 26 of the cradle 20.

Figure 3:
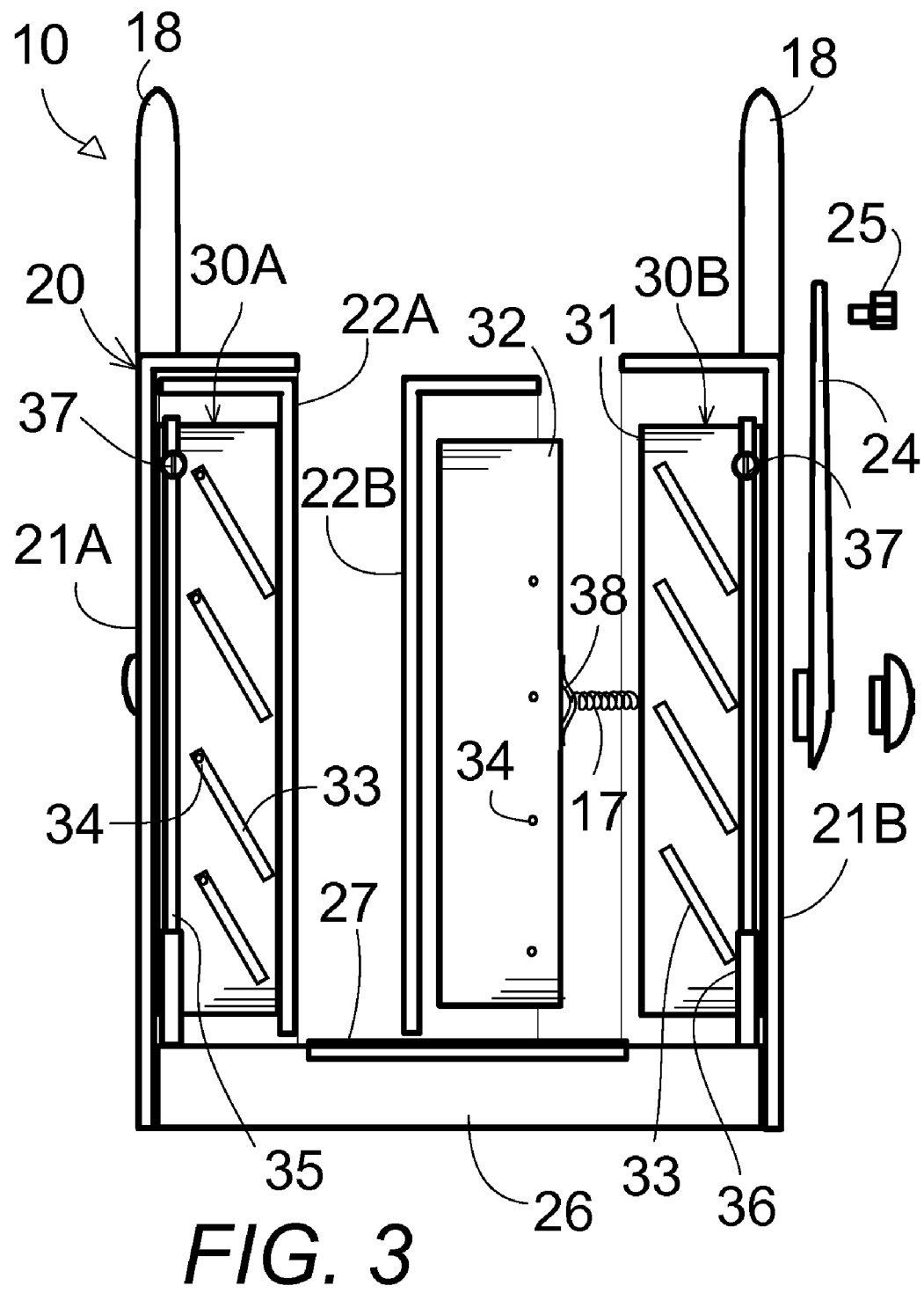
FIG. 3 is a front elevational partially exploded view of the adjustable panel dolly apparatus of the present invention shown with the front facing walls of the side panels removed for viewing the double nested cylinder and cable loop adjustable gripping mechanism which is shown exploded on the right side to view the inner cylinder and outer cylinder.

In FIGS. 1 and 3, the adjustable gripping cradle 20 comprises a bottom receiving platform 26 that rides on the pneumatic wheel means for rolling the cradle 20 to transport the planar object 50; a pair of outer walls 21A and 21B attached to the platform 26, with a pair of side gripping panels 22A and 22B extending upwardly perpendicular to the to the platform 26; and a means for moving the panels 22A and 22B together to grip and retain the planar object 50 resting on the bottom receiving platform 26 and for moving the gripping panels 22A and 22B apart for unloading and loading the planar objects 50.

Figure 4:
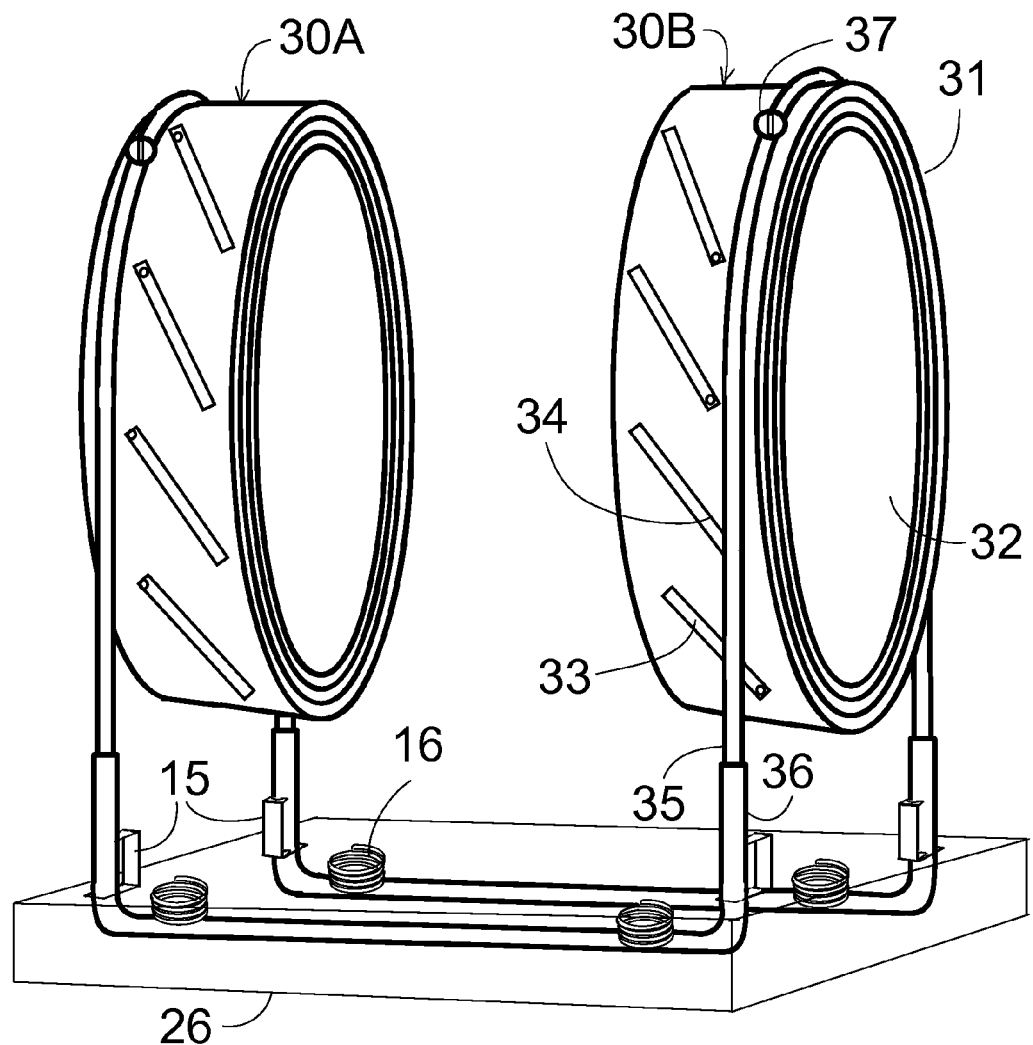
FIG. 4 is a perspective view of the double nested cylinder and cable loop adjustable gripping mechanism of the present invention with the bottom receiving platform shown in phantom to reveal the pair of tubes for the cable loop and springs between the tubes and the bottom receiving platform as well as the cut out and bent up tube support clips.

In FIGS. 1, 3 and 4, the means for moving the gripping panels 22A and 22B together and apart comprises a pair of double nested hollow cylinders or cylindrical drums 30A and 30B in which a first hollow cylindrical drum (or outer cylinder) 31 is attached to each of the outer walls 21A and 21B and a second cylindrical drum (or inner cylinder) 32 fits slidably within the first cylindrical drum 31 and is attached to each one of the gripping panels 22A and 22B. Each first cylindrical drum 31 has a series of spaced parallel grooves 33 that are equally spaced around the outer surface of the drum 31.

The second cylindrical drum 32 has a series of protrusions 34 equally spaced around the outer surface. Each of the protrusions 34 of the second cylindrical drum 32 fits within one of the parallel grooves 33 of the first cylindrical drum 31, so that turning the first cylindrical drum 31 clockwise and counterclockwise causes the parallel grooves 33 to move the protrusions 34 of the second cylindrical drum 32. This, in turn, causes the second cylindrical drum 32 to advance the gripping panel 22A and 22B to contact a planar object 50 on the platform 26 and retract to release the planar object 50. In FIG. 4, single cable loop 35 (preferably aviation steel cable) is wrapped around both of the double nested cylinders 30A and 30B and under the platform 26 with the cable 35 attached at one point by at least one screw 37 to each of the first cylindrical drums 31 so that both of the first cylindrical drums 31 move simultaneously by turning one of the drums.

Figure 2:
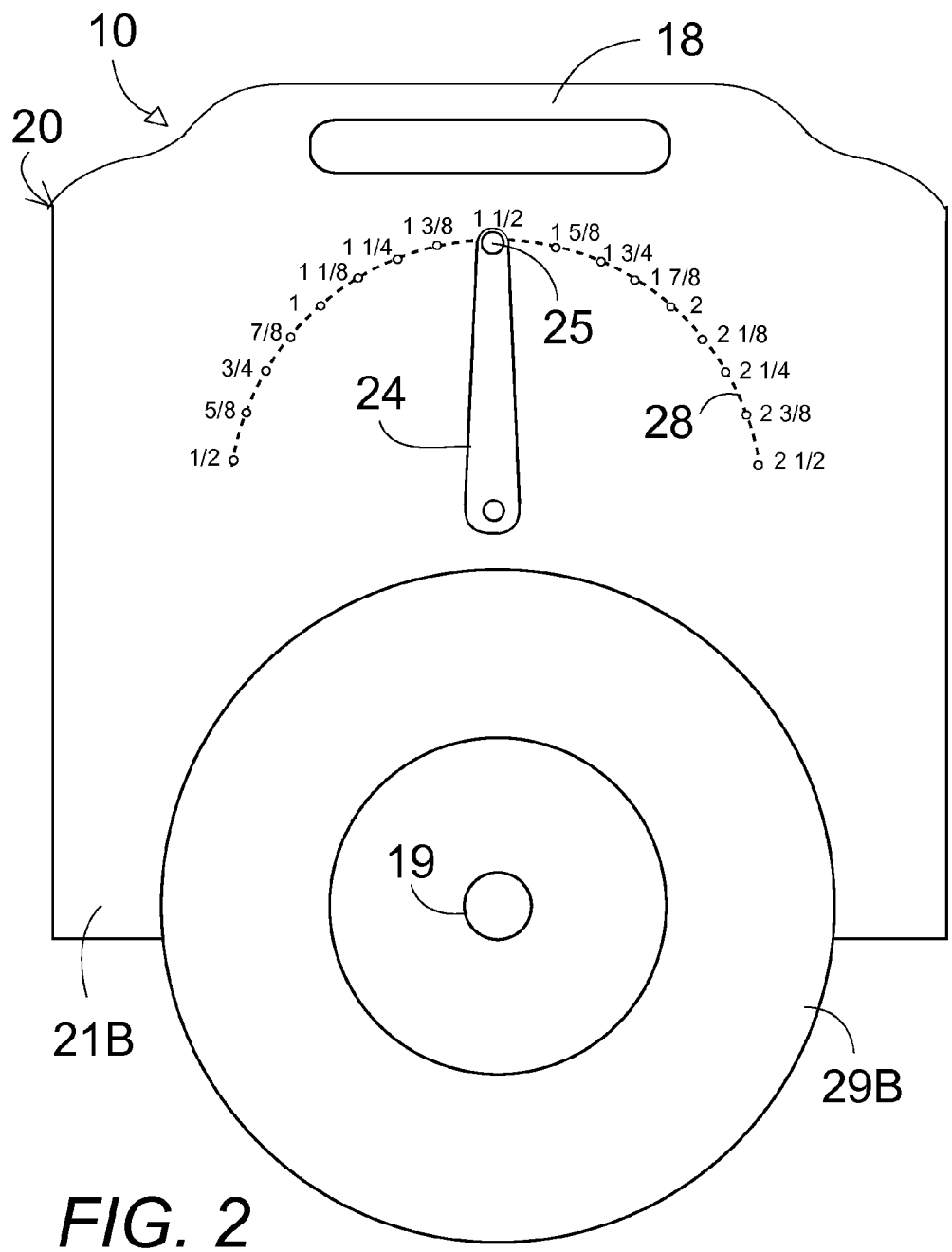
FIG. 2 is a side elevational view of the adjustable panel dolly apparatus of the present invention showing the control lever and grip spacing gauge.

A pair of tubes 36 extend under the platform 26 between the panels 22A and 22B for receiving the two sides of the cable loop 35 which slides within the tubes 36. In FIGS. 1-3, a control knob 25 attaches to a control lever 24 which communicates with the first cylindrical drum 31 on a first panel 22B to turn the drum 31 clockwise and counterclockwise. The control lever 24 is positioned on an outside face 21B of the first panel 22B, thereby forming an adjustable panel dolly 10 with the gripping panels 22A and 22B moving simultaneously with a single control 25.

In FIGS. 1 and 3, the platform further comprises an attached covering made of a cushioned, non-slip material 27 to protect the edges of the planar objects 50 that rest thereon and retain them from sliding off the platform 26.

In FIGS. 1 and 2, the means for rolling the cradle 20 preferably comprises a pair of pneumatic wheels 29A and 29B connected by an axle 19 attached to the platform 26, with the wheels 29A and 29B each extending from an external ground surface to a midpoint of the adjacent panel.

In FIGS. 1-3, a handle 18 is shown on the top of at least one of the outside walls 21A and 21B for carrying the apparatus 10 when not in use with no load on the dolly.

In FIG. 3, a counteracting spring 17 is shown mounted between the second cylinder 32 and the outside wall 21B and attached to a spring loop 38 to aid in retracting the cylinder 32 to the open position.

In FIG. 4, a pair of bottom springs 16 is shown between the platform 26 and the cable tubes 36 to assist in maintaining uniform tension and to ensure even sliding of the two gripping panels 22A and 22B even if the cable 35 stretches over time.

FIG. 1 shows the adjustable panel dolly apparatus 10 with a couple of planar objects 50 secured in the cradle 20 and the double nested cylinders 30A and 30B with cable loop 35 adjustable gripping mechanism.

FIG. 2 shows the adjustable panel dolly apparatus 10 with the control lever 24, control knob 25, and grip spacing gauge 28.

FIG. 3 shows the adjustable panel dolly apparatus 10 with the front facing walls of the side panels removed for viewing the double nested cylinders 30A and 30B and cable loop 35 adjustable gripping mechanism. The right double nested cylinder 30B shows the inner cylinder 32, outer cylinder 31, and spring mechanism 17 and spring attaching loop 38.

FIG. 4 shows the double nested cylinder 30A and 30B and the cable loop 35 adjustable gripping mechanism with the bottom receiving platform 26 shown in phantom to reveal the pair of tubes 36 for the cable loop 35 and springs 16 between the tubes 36 and the bottom receiving platform 26. as well as the cut out and bent up tube support clips 15.

In use, an adjustable panel dolly 10 has center (or gripping) panels 22A and 22B that can be adjusted from ½ inch to 2½ inches wide in order to accommodate a variety of elongated panels, doors, or any elongated material (planar object) 50. Larger dollies with wider grips may be used for large applications. This device 10 has a surface 26 that receives the panels 50 on a cushioned, non-slip material 27 to protect the edges of the panels and at the same time retain the panels 50 from sliding off the panel dolly 10. Both sides of the panel dolly have double-nested cylinders 30A and 30B with an outer cylindrical drum 31 with grooves 33 in a diagonal line and an inner cylindrical drum 32 with protrusions 34 spaced apart on the drum to fit into the grooves 33. The spaced parallel grooves 33 are offset by 1" to throw the interior drum cylinder 32, and thus the gripping panel sides 22A and 22B, inward to restrict the space on the panel dolly. This process allows different sizes of panels or planar objects 50 to be gently inserted in order to transport to different locations. Both internal sides or gripping panels 22A and 22B fully thrown inward allow a panel of ½" to fit. Retracting the inner panels 22A and 22B widens the gap and allows wider material to be inserted between the two inner gripping panels 22A and 22B. Both adjustable inner sides are adjusted by one exterior knob 25 attached to a control lever 24 connected to the other side by a tube 36 with a cable 35 running through the tube 36 mounted on the opposite side drum 30A. A counteracting spring 17 is mounted on each inner cylindrical drum 32 attached to each adjacent external wall 21B to aid in retracting the drum to its original position. The assembly rides on an axle 19 extending through the base 26 and mounted on this axle 19 are pneumatic wheels 29A and 29B on each side of the panel dolly making it maneuverable over obstacles without hindering the handling of the device. The device has a handle 18 on the top of both outside panels 21A and 21B to aid in its transportation with no load on the dolly.

It is understood that the preceding description is given merely by way of illustration and not in limitation of the invention and that various modifications may be made thereto without departing from the spirit of the invention as claimed.

What is claimed is:

1. An adjustable panel dolly apparatus comprising:
an adjustable gripping cradle for receiving at least one planar object having an edge of the planar object resting in the cradle, the cradle comprising a bottom receiving platform riding on a means for rolling the cradle to transport the planar object, a pair of outer walls attached to the platform, a pair of side gripping panels extending upwardly perpendicular to the to the platform, means for moving the panels together to grip the at least one planar object to retain the at least one planar object resting on the platform and for moving the panels apart for releasing and installing the at least one planar object;
the means for moving the panels together and for moving the panel apart comprising a pair of double nested cylinders comprising a first hollow cylindrical drum attached to each of the outer walls, a second cylindrical drum fitting slidably within the first cylindrical drum and attached to each one of the gripping panels, each first cylindrical drum having a series of spaced parallel grooves through the first cylindrical drum around the outer surface of the drum, the second cylindrical drum having a series of protrusions around the outer surface of the second cylindrical drum, each of the protrusions fitting within one of the parallel grooves of the first cylindrical drum so that turning the first cylindrical drum clockwise and counterclockwise causes the spiral grooves to move the protrusions of the second cylindrical drum causing the second cylindrical drum to advance to contact a planar object on the platform and retract to release the planar object; a single cable loop wrapped around both of the double nested cylinders and under the platform, the cable attached at one point to each of the first cylindrical drums so that both of the first cylindrical drums move simultaneously by turning one of the drums; a control lever communicating with a first cylindrical drum on a first panel to turn the drum clockwise and counterclockwise, the control lever positioned on an outside face of the first panel, thereby forming an adjustable panel dolly with the gripping panels moving simultaneously with a single control.

2. The apparatus of claim 1 wherein the platform further comprises an attached covering comprising a cushioned, non-slip material to protect the edges of the planar objects resting thereon and retain the panels from sliding off the platform.

3. The apparatus of claim 1 further comprising a pair of tubes extending under the platform between the panels for receiving the two sides of the cable loop sliding within the tubes.

4. The apparatus of claim 1 wherein the means for rolling the cradle comprises a pair of pneumatic wheels connected by an axle attached to the platform, the wheels each extending from an external ground surface to a midpoint of the adjacent panel.

5. The apparatus of claim 1 further comprising a handle on the top of at least one of the outside walls for carrying the apparatus when not in use.

6. The apparatus of claim 1 further comprising a counter acting spring mounted between the second cylinder and the outside wall to aid in retracting the cylinder to the open position.

7. The apparatus of claim 1 further comprising a bottom spring between the platform and the cable tubes to assist in maintaining uniform tension to insure even sliding of the two gripping panels even if the cable stretches over time.

* * * * *